Jan. 12, 1960   J. G. LEE   2,920,864
SECONDARY FLOW REDUCER

Filed May 14, 1956   2 Sheets-Sheet 1

INVENTOR
JOHN G. LEE
BY Leonard F. Wekland
ATTORNEY

INVENTOR
JOHN G. LEE
BY Leonard F. Wiklund
ATTORNEY

United States Patent Office 2,920,864
Patented Jan. 12, 1960

2,920,864

SECONDARY FLOW REDUCER

John G. Lee, Farmington, Conn., assignor to United Aircraft Corporation, East Hartford, Conn., a corporation of Delaware Application May 14, 1956, Serial No. 584,551

5 Claims. (Cl. 253—39)

This invention relates to cascades of airfoils such as compressors or turbines or the like and more specifically to means for reducing secondary flow.

In a passage where a plurality of blades are operating there is an interaction of the boundary layer flow along the passage walls and the flow over the blading. This interaction sets up local circulatory flows in the blade passages which result in high losses.

It is therefore an object of this invention to reduce or eliminate secondary flow in cascades such as compressors and the like.

This and other objects of this invention will become readily apparent from the following detailed description of the drawing in which.

Figure 1:
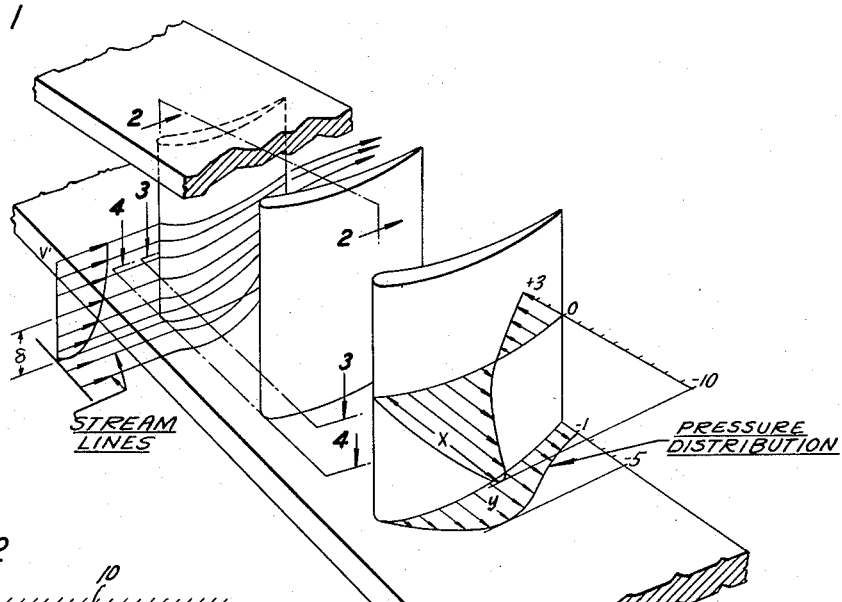
Fig. 1 is a partial cross-sectional schematic illustration of the interblade secondary flow conditions, as for example in a compressor.

Patent No. 2,735,612, issued February 21, 1956, to George F. Hausmann illustrated one method of reducing the effect of secondary flow in axial flow compressors, for example, so as to reduce the losses normally due to this phenomenon.

It is known that the boundary layer which builds up along the confining walls of an axial flow compressor or similar turbomachinery tends to interact with the flow passing over the compressor blades so as to induce what is known as secondary flow.

A secondary flow may be defined as a flow having substantial velocity components at right angles to the main flow. It takes place in almost all fluid confining passageways which are not straight. Thus secondary flow may be expected to occur in axial compressor and turbine passages and in air inlet ducts. It tends to occur in stationary passages such as the stators of axial flow compressors as well as in rotating passages. It also tends to occur whether or not the boundary layer flow is separated from the passage walls.

It is probably helpful to consider a simple case of a group of parallel stationary blades between two parallel walls. This is known as a cascade of blades, and is one of the configurations used for testing new types of compressors. It is shown diagrammatically in Fig. 1.

When air flows through such a cascade of blades it is influenced by the shape of the passage defined by the two end plates and the two adjoining blades, as well as by the shape of the blades themselves. Turning first to the shape of the blade, which is in general in the form of an airfoil, a reduced pressure or suction occurs on the convex sides of the blade exactly as it does on an airplane wing. The magnitude of this suction depends upon the velocity of the air over the blade. The velocity in turn will depend upon the friction of the air on the passageway. This friction is much greater near the end plates where the air rubs on both the plate and the blade. Thus the magnitudes of the suction may vary from a maximum, X, as shown at the mid-span of the blade, to a minimum, Y, shown at both ends of the blade.

The foregoing situation results in a lower pressure at the mid-span of the blade on its convex side then exists at the tips. Consequently, air will flow inward from the relatively high pressure region of the tips to the relatively low pressure region at the center, on the convex side of the blade.

Precisely the reverse is taking place on the concave side of the blade. Here again, as with a wing, a positive pressure occurs on the concave side and this pressure is proportional to the velocity. Likewise, the pressure at the mid-span will be greater than the pressure at the ends due to the lower velocity at the ends. Thus a flow is engendered from the center outward toward the end walls on the concave side. If these two flows are superimposed in a single passage as shown on Fig. 2, it will be observed that there is a flow inward along the convex surface and outward along the concave, and two complete rotary flows are established which are substantially at right angles to the main flow through the passage.

It must be pointed out that these flows will tend to exist whether the passage flows full or separated, or whether the passage as a whole is tapered or not, or whether there is centrifugal force present or not. The flow separation which results from the secondary flow on the convex surface can represent as much as 10 times the losses in pressure which would result from boundary layer separation, alone, on the blade and casing surfaces.

The formation of secondary flows in compressors can be explained by consideration of known aerodynamic principles. Referring to Fig. 1, a cascade of three compressor blades is shown attached to a casing surface. The distribution of approach velocity, $V_1$, has a boundary layer, or region of reduced velocity adjacent the wall, which has a total thickness $\delta$. As a consequence of this velocity distribution, the spanwise distribution of pressures on the blade are not equal, and the minimum suction pressure ($-10$ on Fig. 1) occurs at the mid-span portion of the blade. At the blade extremities which are immersed in the boundary, the suction pressure is reduced ($-5$) such that there is a positive pressure gradient from the extremities toward the mid-span of the convex surface of the blade. This pressure gradient is a maximum at or upstream of the chordwise position of maximum blade thickness and diminishes toward the trailing edge. As a consequence of this condition, the flow in the boundary layer on the casing wall adjacent the convex blade surface flows onto the blade with a radial movement towards the blade trailing edge at mid-span. The presence of the secondary flow causes a general breakdown of the flow over the entire blade such that the flowturning is reduced, the pressure losses are increased and the efficiency and useful operating range of the compressor is reduced. If secondary flows were not involved, the separation of the flow in the boundary layer on the blade surface or casing wall would not seriously compromise compressor performance.

Figure 2:
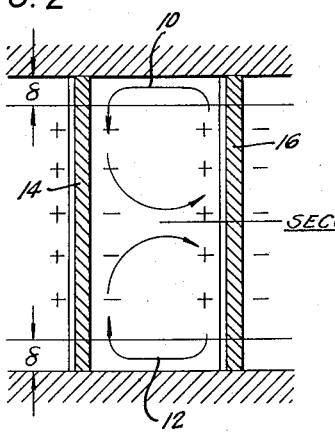
Fig. 2 is a perspective illustration of a part of a compressor rotor including one embodiment of this invention.

A contributing factor to the formation of secondary flow is illustrated in Fig. 2. The pressures on the convex blade surfaces are denoted by the symbol ($+$) and pressures on the suction surfaces are denoted by the symbol ($-$). The value of the symbol is indicative of the magnitude of the local pressure or suction. When there is a boundary layer of finite thickness, δ, on the casing walls upstream of the blade row, this region of low velocity (energy) provides a natural path for flow from the pressure (+) surface of one blade towards the suction surface (−) of the adjacent blade. If this secondary flow occurs on the upstream portions of the blade, the fluid will flow from the casing wall onto the convex blade surface and will be swept radially downstream, thus contributing to the inefficiency of the compressor. It is again emphasized that the secondary flow will persist even if the boundary layer on the casing wall is not separated.

Figure 3:
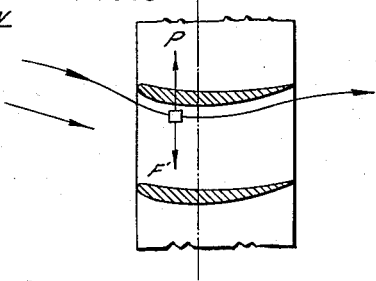
Fig. 3 is a modification of the Fig. 2 illustration.
Figure 4:
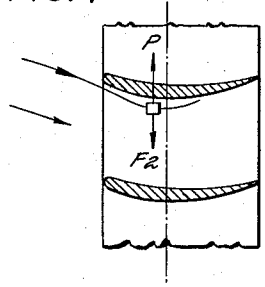
Fig. 4 is another embodiment of this invention.

A third contributing factor to the formation of secondary flow can be realized from consideration of the forces on two adjacent particles of fluid, one in the wall boundary layer (Fig. 4) and one immediately outside of the wall boundary layer (Fig. 3). It is generally accepted that the static pressure throughout a boundary layer is constant. Therefore, the pressure force, P, on the two particles of fluid is equal. However, due to the difference in velocity of the flow at two sections, the centrifugal force on the particle at the edge of the wall boundary layer will be equal and opposite to the pressure force, P, such that the forces are in equilibrium and the particle follows the blade contour.

Figure 5:
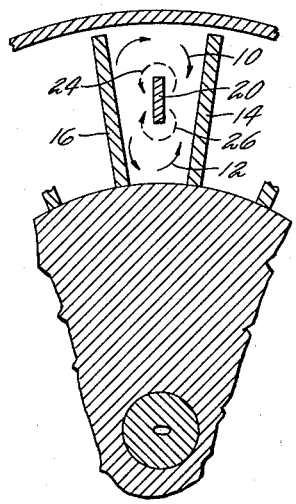
Fig. 5 is a cross section similar to Fig. 2 illustrating the flow effect of the auxiliary airfoils.

As seen again in Fig. 2, secondary flow takes the form of two oppositely rotating flows as shown by the arrows 10 and 12. In Fig. 2 the compressor blades 14 and 16 are shown only schematically so that the convex and concave sides are not apparent. The flow, as shown by the arrows 10 and 12, increases the losses considerably in a compressor. In order to avoid these losses according to this invention an auxiliary member is located in the space between adjacent blades of a cascade such as an axial flow compressor rotor. As seen both in Figs. 5 and 6, a short airfoil 20 is mounted substantially midway between the blades 14 and 16. The airfoil 20 is mounted such that its convex and concave sides correspond to the position of the concave and convex sides of the blades 14 and 16. The span of the airfoil 20 is substantially less than the span of the main compressor blades 14 and 16 but will have a somewhat higher angle-of-attack relative to the oncoming airstream. As better seen in Fig. 5, the airfoil 20 serves two purposes. First of all, it serves as a physical barrier to the induced rotation shown by the arrows 10 and 12. In other words any such rotation of the secondary flow will be hindered by the physical barrier presented by the airfoil 20. In addition, since the airfoil 20 has an angle-of-attack which is slightly more than that presented to the oncoming stream by the blades 14 and 16, tip vortices such as shown by the arrows 24 and 26 are generated. These tip vortices, as seen in Fig. 5 are in a direction which opposes the induced rotary motion of the secondary flow. Therefore, the secondary flow is substantially reduced or eliminated with the addition of the auxiliary airfoil 20. The vortices 24 and 26 are spaced radially with respect to the axis of rotation of the rotor and hence form inner and outer vortices lying on the same radius or in the same radial plane.

Figure 6:
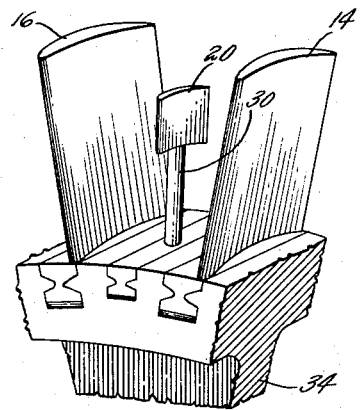
Figs. 6, 7 and 8 are partial perspective views of turbomachine blading indicating different ways for mounting the auxiliary blades.
Figure 7:
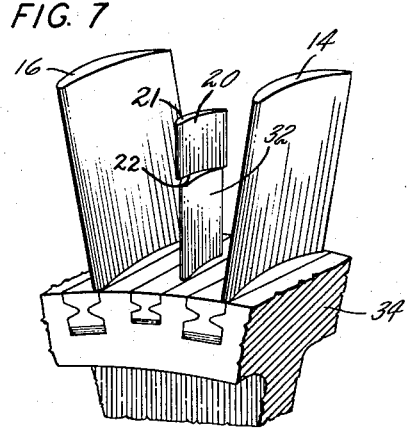

As seen in Fig. 6, the airfoil 20 is supported by a staff or rod 30 so that the lower end surface 22 of the airfoil 20 remains substantially free over a major portion thereof. This rod 30 may be replaced as shown in Fig. 7 by a streamline airfoil 32 which normally would have an angle-of-attack relative to the oncoming stream substantially the same as that of the adjacent blades 14 and 16. The lower end face 22 as seen in Fig. 7 is connected at its trailing edge to the support 32 and being at a different or higher angle of attack than airfoil 32 a substantial part of the leading portion of the face 22 will be free. The free portion is of sufficient magnitude to produce the necessary tip vortex. In each instance the airfoil 20 is supported from the main rotor 34.

Figure 8:
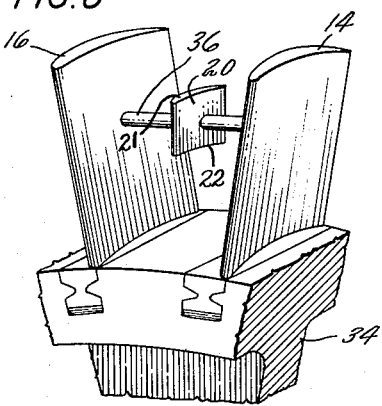

Fig. 8 shows a modification of the Figs. 6 and 7 structure. As shown in here the airfoil 20 is supported by a rod 36 which is mounted at its ends by suitable means to the adjacent blades 14 and 16. The airfoil 20 is suitably fixed to the rod 36 intermediate the ends thereof at a predetermined angle-of-attack. This type of construction has the advantage of eliminating any necessity for having a separately mounted structure in the rotor wheel itself. The airfoil 20 has upper and lower free terminal faces 21 and 22, respectively, forming substantially free airfoil tips.

Figure 9:
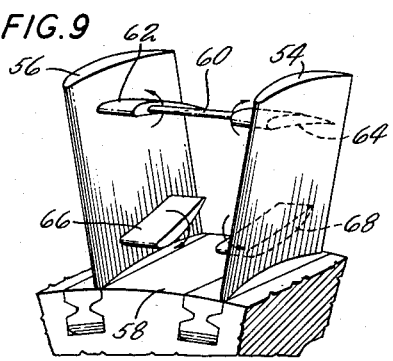
Fig. 9 is a partial perspective view of still another way of mounting the auxiliary blading.

Fig. 9 shows another modification of the fundamental concept of this invention. As shown herein, adjacent blades 54 and 56 of a compressor rotor or stator are peripherally spaced about a rim 58. In construction of rotors it is often desirable to mount braces between adjacent blades and these may take the form of the rod 60. In this event small airfoils 62 and 64 are mounted at the extremities of the member 60 in such a manner that the span of the airfoils is substantially normal to the major surfaces of the blades 54 and 56. The airfoils 62 and 64 are at an angle-of-attack relative to the axis of fluid flow through the passage defined by the blades 54 and 56. The airfoils 62 and 64 would have, for example, a positive angle-of-attack so as to produce tip vortices in a direction shown by the arrows. Another set of vortices which are opposite to those produced by the airfoils 62 and 64 may be produced by similar airfoils 66 and 68 whose spans run substantially parallel to that of the airfoils 62 and 64. The airfoils 66 and 68 are located radially inwardly from the airfoils 62 and 64 and are positioned at a negative angle-of-attack so as to produce vortices which are opposite to those produced by the airfoils 62 and 64. These vortices then will counteract the induced secondary flow. These vortices then will act in substantially the same way or obtain the same final result as the vortices created in the Fig. 5 construction.

As a result of this invention, it will become apparent that a very simple type of construction has been provided for substantially reducing or eliminating secondary flow in compressors or similar cascades of blades.

Although several embodiments of this invention have been illustrated and described herein, it will be apparent that various changes and modifications may be made in the construction and arrangement of the various parts without departing from the scope of this novel concept.

What it is desired by Letters Patent is:

1. In a rotor having at least one row of circumferentially spaced blades, said blades extending radially from the rotor, a support extending from one blade to an adjacent blade and spanning the spaces between adjacent blades, and at least one airfoil carried intermediate the end of each of said supports, said airfoils having their spans running radially with respect to said rotor and running substantially in conformity with said blades in a radial direction, said airfoil terminating in free tips for producing vortices trailing therefrom.

2. In a rotor having at least one row of circumferentially spaced blades, said blades extending radially from the rotor, a support extending from one blade to an adjacent blade and spanning the spaces between adjacent blades, and an airfoil carried midway between said adjacent blades by each of said supports, said airfoils having their spans running radially with respect to said rotor and running substantially in conformity with said blades in a radial direction, said airfoils being disposed at an angle-of-attack relative to the axis of flow of fluid through said rotor which is different than the relative angle-of-attack of said blades, each of said airfoils having two free tips which produce vortices trailing therefrom.

3. In a cascade of rotating blades, said blades having airfoil shape, said blades being spaced substantially transversely of the axis of the fluid stream flowing through the cascade and having inner and outer radial ends, walls at both ends of said blades thereby defining passages between said blades, said blades having a predetermined angle of attack relative to the oncoming stream, the fluid flow through said passages following a path substantially conforming to the contour of the walls forming the passage and means for reducing secondary flow in the passages between adjacent blades comprising a single short airfoil protruding in each of the passages between said blades and including at least two substantially free airfoil tips, said short airfoil having an angle of attack greater than said aforesaid predetermined angle of attack, said free airfoil tips cooperating with said walls and creating at least a pair of radially spaced counter-rotating vortices flowing downstream in said passage.

4. In a cascade according to claim 3 including a support extending radially from one of said walls and connected to said single short airfoil, the tip of the short airfoil to which said support is connected being substantially free.

5. In a cascade according to claim 4 wherein said support is a streamlined strut having an angle of attack relative to the oncoming stream which is substantially the same as that of said blades.

References Cited in the file of this patent

UNITED STATES PATENTS

| | | |
|---|---|---|
| 1,295,315 | Henderson | Feb. 25, 1919 |
| 1,554,614 | Allen | Sept. 22, 1925 |
| 1,748,610 | Marczynski | Feb. 25, 1930 |
| 1,961,214 | Hall | June 5, 1934 |
| 2,030,993 | Langenkamp et al. | Feb. 18, 1936 |
| 2,135,700 | Cierva | Nov. 8, 1938 |
| 2,135,887 | Fairey | Nov. 8, 1938 |
| 2,406,499 | Jandasek | Aug. 27, 1946 |
| 2,650,752 | Hoadley | Sept. 1, 1953 |
| 2,844,001 | Alford | July 22, 1958 |

FOREIGN PATENTS

| | | |
|---|---|---|
| 284,312 | Great Britain | May 3, 1928 |
| 308,991 | Switzerland | Nov. 3, 1955 |
| 630,747 | Great Britain | Oct. 20, 1949 |
| 1,069,279 | France | Feb. 10, 1954 |